No. 797,993. PATENTED AUG. 22, 1905.
M. WADDELL.
AUTOMATIC REGULATOR FOR ELECTRIC CIRCUITS.
APPLICATION FILED JUNE 28, 1904.

2 SHEETS—SHEET 1.

Witnesses
Edward C. Rowland
Florence Pick

Montgomery Waddell
Inventor
By his Attorney H. S. MacKaye

No. 797,993. PATENTED AUG. 22, 1905.
M. WADDELL.
AUTOMATIC REGULATOR FOR ELECTRIC CIRCUITS.
APPLICATION FILED JUNE 28, 1904.

2 SHEETS—SHEET 2.

Witnesses
Florence Pick
Marie M. Hovey

Montgomery Waddell
Inventor
By his Attorney H. S. MacKaye

UNITED STATES PATENT OFFICE.

MONTGOMERY WADDELL, OF NEW YORK, N. Y.

AUTOMATIC REGULATOR FOR ELECTRIC CIRCUITS.

No. 797,993.          Specification of Letters Patent.          Patented Aug. 22, 1905.

Application filed June 28, 1904. Serial No. 214,469.

*To all whom it may concern:*

Be it known that I, MONTGOMERY WADDELL, a subject of the King of Great Britain, residing in the city, county, and State of New York, have invented a certain new and useful Improvement in Automatic Regulators for Electric Circuits, of which the following is a specification.

The present invention relates to an improved regulating means for dynamo-electric machines capable of adaptation to either a constant-current or a constant-potential system of distribution or to a combination of these. The principal application of this improvement is to cases wherein the generator to be regulated is driven at a varying or irregular speed, as is the case, for instance, where a dynamo is driven by the axle of a railway-car for supplying light for such car.

The present improvement is particularly suitable in cases wherein power-generators are used in connection with secondary batteries either with a prime mover of varying speed or otherwise, and I have described this combination hereinafter in connection with my preferred form of regulator.

Figure 1:
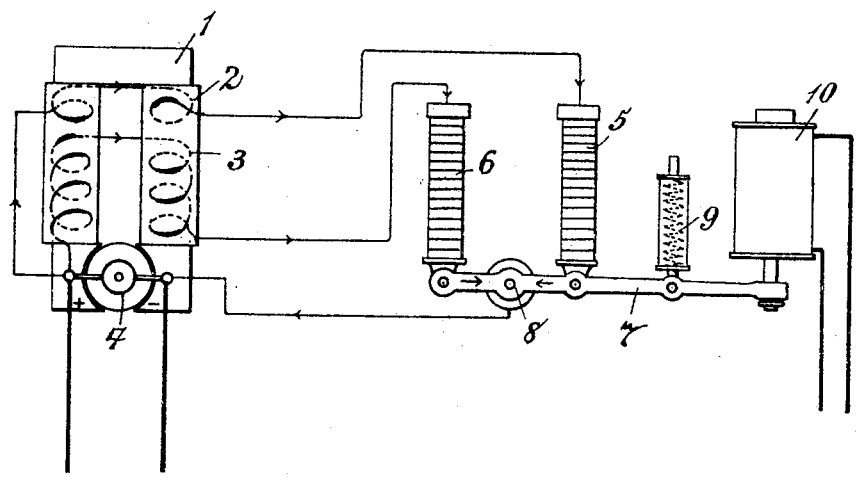
Figure 2:
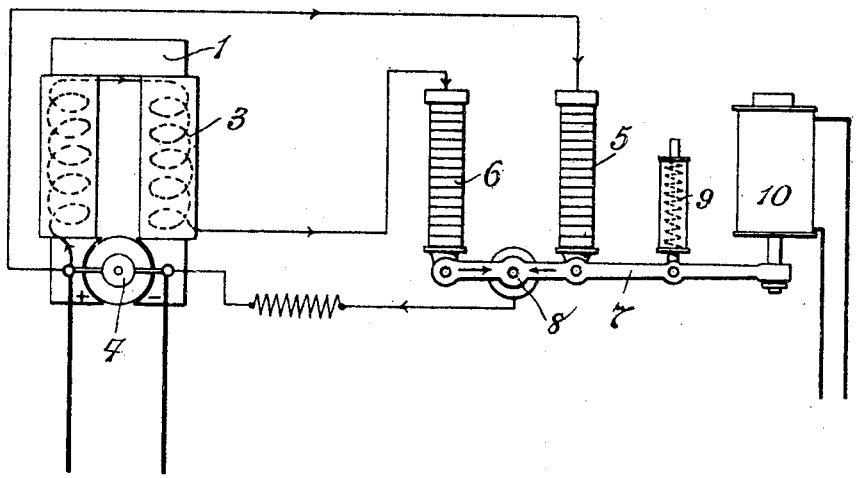
Figure 3:
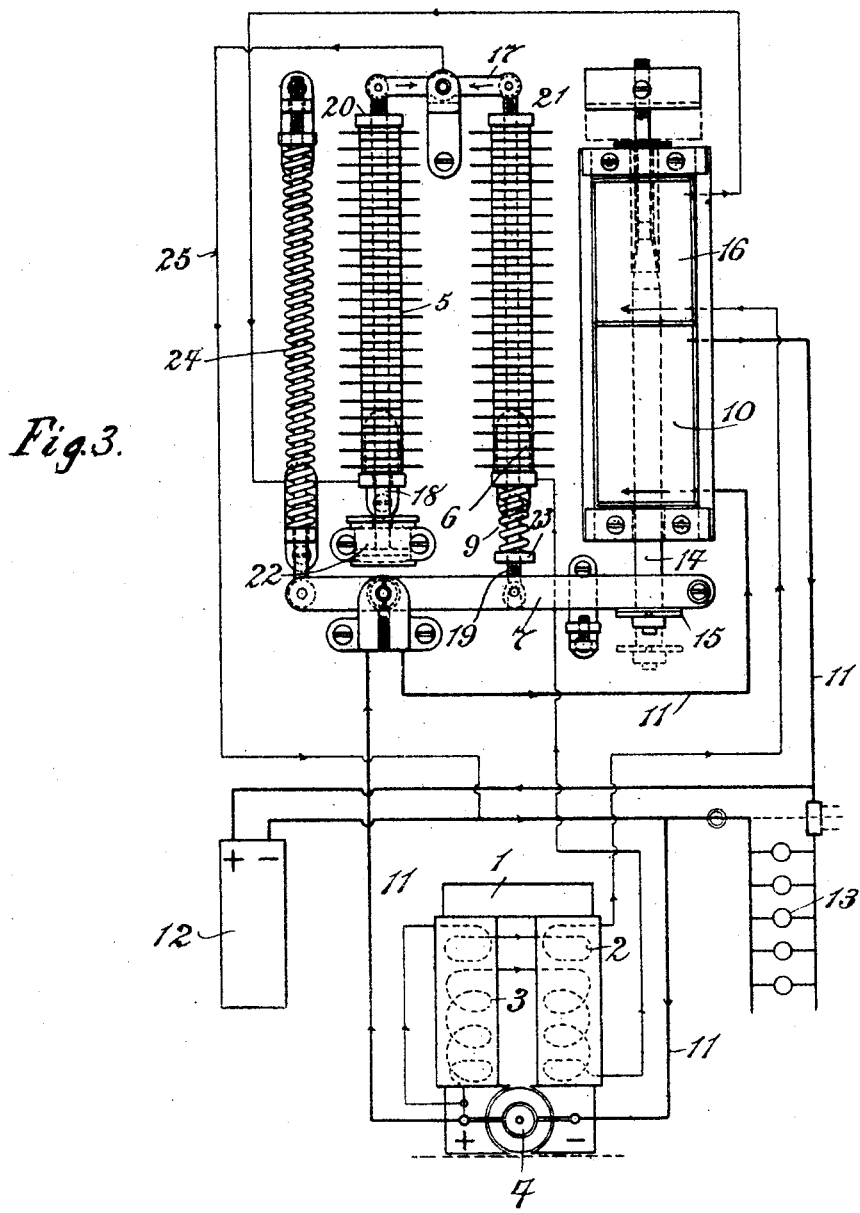

In the accompanying drawings, Figure 1 is a diagram of a simple embodiment of my invention. Fig. 2 is a similar view illustrating the application of one of the principles of my invention to a dynamo with a single-section field-magnet coil; and Fig. 3 is a view, partly in diagram, of the preferred form of my device.

In Fig. 1 the dynamo is shown at 1 and is provided with two sections of field-magnet windings 2 and 3 in shunt with the armature 4 and with each other. The windings 3 are the principal windings or exciting-coils, and the coils 2 are reversely wound, so that they tend to oppose the magnetizing action of the principal coil 3. The necessary current changes in the field-magnet coils are produced by two rheostats 5 and 6, which are preferably composed of columns of resisting bodies whose ohmic resistance varies with changes of pressure on said columns, though other forms of rheostats may be readily adapted. The regulator 7 is pivoted at 8 and the spring 9 or equivalent pressure device tends constantly to tilt the lever 7 one way or the other, as previously determined, on its pivot. The solenoid 10 tends to counteract said spring more or less, according to the current passing through the coils of said solenoid, and thus to vary the pressure on the rheostats. In Fig. 1 the solenoid is supposed to be in series with the main circuit, as indicated by the heavy lines 11; but this is not essential to this invention, as the connection of this primary solenoid-coil will vary with various systems of control. The columns 5 and 6 are pressed upon more or less, respectively, by the two arms of the lever 7, according to the balance existing at any moment between the solenoid effort and the spring effort.

In the arrangement shown in Fig. 1 the rheostatic column 6 is in series with the exciting-coil 3, while the column 5 is in shunt therewith and in series with the reverse-coil 2. In this arrangement the spring 9 tends constantly to compress the column 6 and to relieve pressure on the column 5, thus tending both to increase the current-flow in the exciting-coil 3 and to cut down the flow in the reverse-coil 2. The solenoid by counteracting this tendency tends to weaken the field-magnet of the dynamo 1 when rise in current occurs in the main circuit.

As shown in Fig. 2, my present invention is applicable in a modified form to a dynamo wherein there is no reverse-coil. Here the parts above described are still connected to the dynamo, so that one column 5 is in shunt with the exciting-coil 3 and the other column 6 is in series therewith; but the reverse-coil 2 in series with 5 is omitted. In this form the rheostats are still treated so as to produce a cumulative effect upon the field-magnet; but this effect is not as great proportionately, owing to the absence of the reverse-coil 2. While I have herein shown a shunt-wound generator in combination with my regulating system, it is to be understood that this invention is not limited to combinations wherein the generator is necessarily of this type.

In Fig. 3 I have shown an embodiment of my invention wherein the solenoid is constructed with two exciting-coils so connected that small current changes in the main circuit produce relatively large effects in the solenoid, and the delicacy and range of regulation is thereby increased. At the same time one of the solenoid-coils can be utilized, if desired, for closing the main circuit.

In Fig. 4 the main or primary solenoid-coil 10 is in series with the main circuit 11, which feeds a secondary battery 12, and translating devices, such as lights, for instance. (Shown at 13.) The regulating-lever 7 is lifted by means of the solenoid-core 14, which carries the cross-piece 15, whereby the main circuit is closed through the lever 7 in the manner described in my patent application of even date herewith, Serial No. 214,468. This closure is accomplished by means of the secondary coil 16 on the solenoid, which coil remains constantly in series with the reverse-coil 2 on the dynamo field-magnet. The coil 16 is preferably so proportioned as to lift the core 14 even when the machine has just started up and reached its proper potential and the resistance of the column 5 in series with 16 is at its maximum. If desired, a third coil on the solenoid, as shown in my Letters Patent No. 760,091, may be employed.

A transmitting-lever 17 is pivoted between the two rheostatic columns 5 and 6, and the two arms of said lever extend across the adjacent ends of said columns, respectively. A rod 18 passes axially through the column 5, and a second rod 9 passes axially through the column 6, and both are insulated from the column. They are pivotally attached to the two arms of the lever 17, and each carries a compression member or nut 20 21, pressing, respectively, on the columns 5 and 6. A dash-pot 22 is placed on the end of the rod 18 to prevent sudden movements, and the lower end of 19 carries an adjustable abutment 23 for the spring 9. The long spring 24 coöperates with the spring 9 in the manner set forth in my pending application for Patent, Serial No. 182,576, filed November 25, 1903. The upper ends of the two columns 5 and 6 are electrically connected through the lever 17 and wire 25 to one leg of the main circuit, while the lower ends of the columns 5 and 6 are connected, respectively, to one end of the solenoid-coil 16 and to one end of the principal or exciting coil 3 of the field-magnet. There are thus two shunt-circuits produced. In one of these the principal field-magnet coil 3 and the rheostat 6 are placed in series with each other, and in the other of these the reverse field-magnet coil, the rheostats 5, and the solenoid-coil 16 are placed in series with each other. The operation of this form of my device is similar to that of the form shown in Fig. 1, save that in the modification shown in Fig. 3 the secondary coil 16 on the solenoid acts to close the main circuit and serves to greatly magnify the regulative effect produced by any incipient potential changes in the armature of the dynamo. This follows from the fact that any slight change in the pressure on the column 5 produces at once in the coil 16 a current change of the same kind as that which first operated in the coil 10 to set up said change of pressure in the rheostat 5. This in turn magnifies the initial pressure change in question, and thus the coil 16 continues to gain or lose strength until a balance is produced by an appropriate change in the power of the coil 10.

A variety of modifications can be made in the construction and arrangement of this device without departing from the scope of my invention, and I am not to be understood as limiting myself to the details herein shown and described.

What I claim is—

1. In a device of the class described, a dynamo, an exciting-coil on the field-magnet thereof, two rheostats in parallel with each other, one of said rheostats being connected in parallel with the whole of said exciting-coil and the second rheostat being connected in series with the whole of said exciting-coil; in combination with means for varying the resistances of said rheostats, substantially as described.

2. In a device of the class described, a dynamo, an exciting-coil on the field-magnet thereof, two rheostats in parallel with each other, one of said rheostats being connected in parallel with the whole of said exciting-coil and the second rheostat being connected in series with the whole of said exciting-coil; in combination with means for simultaneously producing opposite changes in resistance in said rheostats, substantially as described.

3. In a device of the class described, a dynamo, an exciting-coil on the field-magnet thereof, two rheostats in parallel with each other, one of said rheostats being connected in parallel with the whole of said exciting-coil and the second rheostat being connected in series with the whole of said exciting-coil; in combination with electromagnetic means in circuit with said dynamo for varying the resistances of said rheostats, substantially as described.

4. In a device of the class described, a dynamo, an exciting-coil on the field-magnet thereof, two rheostats in parallel with each other, one of said rheostats being connected in parallel with the whole of said exciting-coil and the second rheostat being connected in series with the whole of said exciting-coil; in combination with electromagnetic means for simultaneously producing opposite changes in resistance in said rheostats, substantially as described.

5. In a device of the class described, a dynamo having two sections of field-magnet coils wound so as to magnetically oppose each other, said coils being in parallel with each other, a rheostat in series with each of said coils and means for varying the resistance of said rheostats, substantially as described.

6. In a device of the class described, a dynamo having two sections of field-magnet coils wound so as to magnetically oppose each other, said coils being in parallel with each other, a rheostat in series with each of said coils and means for simultaneously producing opposite resistance changes in said rheostats, substantially as described.

7. In a device of the class described, a dynamo having two sections of field-magnet coils wound so as to magnetically oppose each other, said coils being in parallel with each other, two rheostats in parallel with each other and respectively in series with said field-magnet coils and means for producing simultaneous and opposite resistance changes in said rheostats, substantially as described.

8. In a device of the class described, a dynamo having two sections of field-magnet coils wound so as to magnetically oppose each other, said coils being in parallel with each other; in combination with means for simultaneously producing opposite current changes in said two sections of field-magnet coil, substantially as described.

9. In a device of the class described, a dynamo having two sections of field-magnet coils wound so as to magnetically oppose each other, said coils being in parallel with each other; in combination with an electromagnetic device in circuit with said dynamo and means governed by said device for producing simultaneous and opposite current changes in said two coils, substantially as described.

10. In a device of the class described, a dynamo having two sections of field-magnet coils wound so as to magnetically oppose each other, said coils being in parallel with each other, two rheostats in parallel with each other and in series respectively with said two coil-sections, an electromagnetic device in circuit with said dynamo and means governed thereby for creating simultaneous and opposite resistance changes in said rheostats, substantially as described.

11. In a device of the class described, a dynamo having two sections of field-magnet coils wound so as to magnetically oppose each other, said coils being in parallel with each other, a rheostat in series with one of said coils and means for varying the resistance of said rheostat, substantially as described.

12. In a device of the class described, a dynamo having a principal or exciting coil and a counteracting-coil on its field-magnet, said latter coil being wound so as to magnetically oppose said principal coil and said two coils being in parallel with each other, a rheostat in series with said counteracting-coil and means for varying the resistance of said rheostat, substantially as described.

13. In a device of the class described, a dynamo having a principal or exciting coil and a counteracting-coil on its field-magnet, said latter coil being wound so as to magnetically oppose said principal coil and said two coils being in parallel with each other, two rheostats in parallel with other and in series respectively with said two coils and an electromagnetic device in circuit with said dynamo for operating said rheostats, substantially as described.

14. In a device of the class described, a dynamo having a principal or exciting coil and a counteracting-coil on its field-magnet, said latter coil being wound so as to magnetically oppose said principal coil and said two coils being in parallel with each other, a rheostat in series with each of said coils, means for producing resistance changes in both of said rheostats, a solenoid for actuating said means and a coil on said solenoid in series with said counteracting-coil on the field-magnet and its rheostat, substantially as described.

15. In a device of the class described, a dynamo, an exciting-coil on the field-magnet thereof, two rheostats, conductors for connecting one of said rheostats in series with said exciting-coil, conductors independent of said exciting-coil for connecting the second rheostat in parallel with said exciting-coil and electromagnetic means for varying the resistance in said rheostats, said means comprising an active coil in series with the rheostat which is in parallel with said exciting-coil, substantially as described.

16. In a device of the class described, a dynamo having on its field-magnet an exciting-coil and a counteracting-coil wound so as to magnetically oppose said exciting-coil, a rheostat in series with each of said coils and means for varying the resistances of said rheostats, substantially as described.

17. In a device of the class described, a dynamo having on its field-magnet an exciting-coil and a counteracting-coil wound so as to magnetically oppose said exciting-coil, a rheostat in series with each of said coils and means for simultaneously producing opposite resistance changes in said rheostats, substantially as described.

18. In a device of the class described, a dynamo having on its field-magnet an exciting-coil and a counteracting-coil wound so as to magnetically oppose said exciting-coil, two rheostats in parallel with each other and each respectively with one of said field-magnet coils, and means for producing simultaneous and opposite resistance changes in said rheostats, substantially as described.

19. In a device of the class described, a dynamo having on its field-magnet an exciting-coil and a counteracting-coil wound so as to magnetically oppose said exciting-coil; in combination with means for simultaneously producing opposite current changes in said two coils, substantially as described.

20. In a device of the class described, a dynamo having on its field-magnet an exciting-coil and a counteracting-coil wound so as to magnetically oppose said exciting-coil, in combination with an electromagnetic device in circuit with said dynamo and means governed by said device for producing simultaneous and opposite current changes in said two coils, substantially as described.

21. In a device of the class described, a dynamo having on its field-magnet an exciting-coil and a counteracting-coil wound so as to magnetically oppose said exciting-coil, a rheostat in series with each of said coils and an electromagnetic device in circuit with said dynamo and means governed thereby for producing simultaneous and opposite resistance changes in said rheostats, substantially as described.

MONTGOMERY WADDELL.

Witnesses:
WILLIAM H. KETTRA,
JOSEPH A. O'DONNELL.